Sept. 4, 1951 S. C. BEESCH 2,566,306
SAMPLING APPARATUS
Filed June 15, 1948

INVENTOR.
Samuel C. Beesch
BY
ATTORNEY

Patented Sept. 4, 1951

2,566,306

UNITED STATES PATENT OFFICE 2,566,306

SAMPLING APPARATUS

Samuel C. Beesch, Columbus, Ohio, assignor to Publicker Industries Inc., Philadelphia, Pa., a corporation of Pennsylvania Application June 15, 1948, Serial No. 33,043

2 Claims. (Cl. 195—127)

This invention relates to an apparatus suitable for use in effecting fermentation processes of various kinds. More particularly, it pertains to a fermentation apparatus having a combination of novel inoculating and sampling devices.

Efficient and practical sampling and inoculating devices are two of the most important and desirable features of a good fermentation vessel. Frequently, it is necessary or desirable, especially in the case of aerobic fermentations, to withdraw sterile samples and to continue the fermentation on a suitable shaking machine. With mashes such as those encountered in various industrial fermentations using yeasts, molds, or bacteria as the fermentative organism, sampling devices are required which will allow large particles or clumps of mash to be intermittently discharged from the fermenter. Also, it is frequently desired to add relatively large volumes of inoculum. Such inoculations must be effected under conditions providing for an absolute minimum contamination of the mash at this step. Numerous means have been devised to aid in carrying out the inoculation and sampling steps; however, none of them has met with unqualified success. For example, diaphragms constructed of a suitable material such as neoprene have been placed over a conveniently located opening in the fermentation vessel and inoculation and sampling of the mash effected by the use of large hypodermic syringes. "Blow cases," by which the inoculum is forced into the mash under sterile air pressure have likewise been proposed as described in U. S. Patent No. 2,341,259 to Baldwin. The use of ordinary sample cocks to withdraw samples of the fermenting mash has also been attempted. However, when employing apparatus of this type, it is extremely difficult to obtain a sterile aseptic sample inasmuch as the addition of a separate sampling device also adds another possible source of contamination of the mash as the result of leakage, poor fitting of the valve sleeve or gate, and growing back of contaminating organisms in the sample cock line.

It is an object of my invention to provide a simple, efficient means for aseptically inoculating and withdrawing sterile mash samples from fermentation vessels.

It is a further object of my invention to provide a means whereby large or small volumes of mash can be aseptically inoculated and to provide a means by which sterile samples of mash can be rapidly taken from the most viscous and heavy mycelial mashes.

Figure 1:
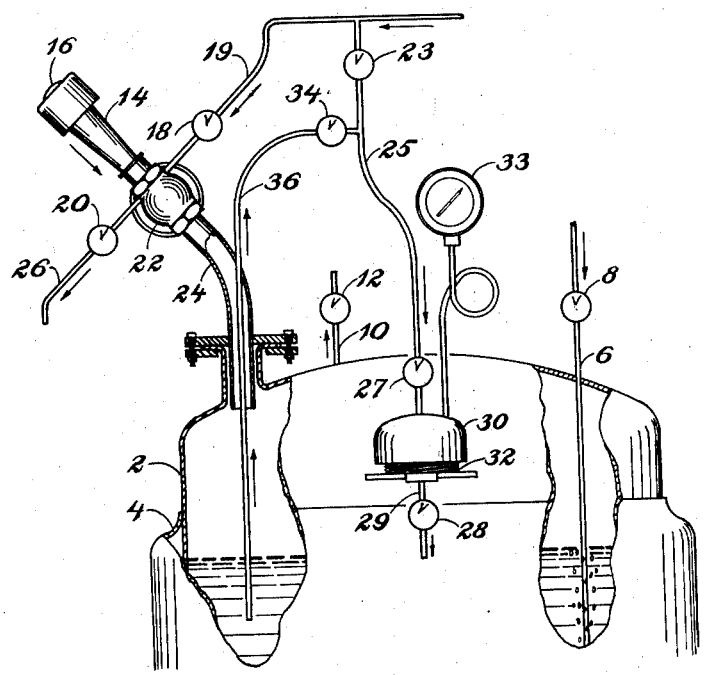
Figure 2:
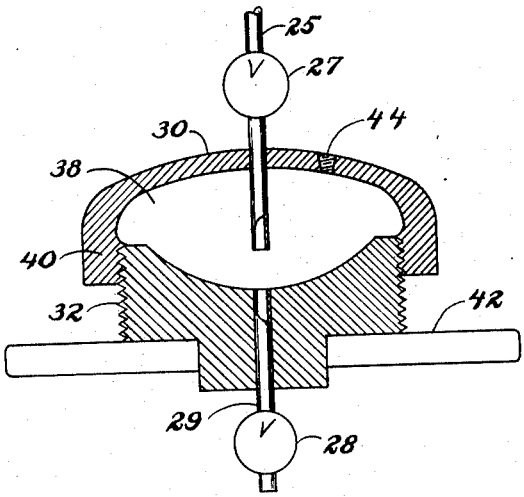

The present invention may be further illustrated by referring to the accompanying drawing in which Fig. 1 is an elevational view, partly in section, of a typical inoculation and sampling device contemplated, in combination with a conventional fermentation vessel. Fig. 2 is a sectional view illustrating in detail a preferred embodiment of the sampling chamber generally shown in Fig. 1.

Referring to Fig. 1, 2 is a fermentation vessel of conventional design fitted with jacket 4 through which a suitable heat exchange medium can be circulated if desired. Vessel 2 is preferably maintained under a sterile air pressure of from 1 to 5 pounds, introduced through line 6. Prior to introduction of the inoculum, valve 12 of air outlet 10 and valve 8 are closed. The inoculum of the desired organism is then brought in proximity to receiving nozzle 14, after which nozzle cover 16 is removed, and steam inlet valve 18 and condensate drain valve 20 are closed. Valve 22, cooperating with nozzle 14 and conduit 24, is opened thereby releasing the positive pressure within the vessel after which the inoculum is introduced into fermenter 2 through receiving nozzle 14. As the last of the inoculum is introduced, valve 22 is closed and live steam is again introduced through line 19 into nozzle 14 and adjoining valve 22 and the condensate drained off through line 26 by opening valve 20. The pressure within vessel 2 is then brought back up to the desired level by introducing sterile air through line 6 and properly adjusting valve 12 of outlet line 10.

To withdraw samples of the mash during fermentation, valves 27 and 23 in steam line 25 are closed and valve 28 is opened to release the steam pressure in line 29 and sampling chamber 30, which is secured to the exterior of fermenter 2 by means of a weld not shown. After sampling chamber 30 has been allowed to cool sufficiently, the lower portion thereof 32 is removed after which valves 34 and 27 are opened to allow the mash to flow through lines 36 and 25 into a suitable sterile receiving flask (not shown), the mouth of which fits snugly within the upper portion of chamber 30. After the sterile sample has been obtained, valve 34 is closed and valve 23 opened whereby the mash residue in line 25 is blown to the sewer. Sampling chamber 30 is then reassembled and the steam pressure within said chamber is brought up to a gauge pressure of 15 pounds, as noted on pressure gauge 33, in order to maintain the apparatus in a sterile condition.

Referring to Fig. 2, details of one embodiment of a preferred design of sampling chamber are given. Line 25, through which the flow of mash or live steam is controlled by valve 27, is tightly fitted into the upper portion of chamber 30 and extends into space 38 formed by threadedly engaging hollow cap 40 with concave threaded plug 32 through which runs line 29. Plug 32 is removed or tightened by the aid of handles 42. In cap 40 is hole 44 adapted to receive a suitable pressure gauge not shown. Lines 25 and 29 and handles 42 are preferably rigidly engaged to chamber 30 by means of welds not shown.

From the standpoint of ease of maintaining the equipment absolutely sterile at all times, it is recommended that stainless steel valves and seamless stainless steel pipes be used throughout and that the equipment be so designed that no sharp corners or dead ends are present to encourage contamination.

Use of the equipment described and claimed herein is highly desirable in any type of fermentation process presently known; such as for example, in the production of acetone and butanol, riboflavin, gluconic acid, penicillin, streptomycin, 2 and 5-ketogluconic acids, fumaric acid, 2,3-butylene glycol, etc.

It will be apparent to those skilled in the art that I have devised a simple means for readily effecting, under absolutely sterile conditions, inoculation of mashes and a convenient method for intermittently withdrawing sterile samples thereof during fermentation. One particularly outstanding advantage of the apparatus contemplated by my invention resides in the fact that both the inoculating and sampling devices can be kept under live steam. Frequently, as previously pointed out, in the case of oxidative fermentations it is necessary to withdraw sterile samples and continue fermentation on a shaking machine. By employing an apparatus of the above described type, I have found it possible to obtain such samples in an absolutely sterile condition. To my knowledge, no other method of accomplishing that object is known to the art. Both inoculating and sampling devices should be used with fermentations in which it is possible to maintain a positive sterile air or gas pressure in the vessel in order to maintain sterility and to obtain samples by means of the positive pressure.

While I have described a preferred embodiment of the apparatus of my invention, it will be apparent to those skilled in the art that numerous modifications thereof are possible without departing from the scope of my invention. Accordingly, it is to be strictly understood that such modifications are intended to lie within the scope of the broad claims appended herein.

What I claim is:

1. For use in withdrawing uncontaminated samples from an enclosed fermentation vessel or the like constructed and arranged normally to be maintained at super-atmospheric pressure; a generally hollow enclosed sampling device located outside of said vessel and including an upper portion and a detachable lower closure portion, said closure portion having an outlet opening communicating with a drain-line having a shutoff-valve operatively connected therewithin, a steam-line leading to said upper member and communicating with the underside thereof, a withdrawal-line extending downward within said vessel below the liquid level thereof and emerging through the top of said vessel, said withdrawal-line communicating with said steam-line at a point somewhat spaced from the sampling device, a shutoff-valve operatively connected within said withdrawal-line closely adjacent its point of communication with said steam-line, a shutoff-valve operatively connected within said steam-line ahead of said point of communication, and a second shutoff-valve operatively connected within said steam-line intermediate said point of communication and said sampling device.

2. For use in withdrawing uncontaminated samples from a fermentation vessel or the like; a generally hollow enclosed sampling device including an upper generally cup-shaped portion and a lower closure portion screw-threadedly mounted on said upper portion and constructed and arranged to be quickly detached from and re-attached to said upper portion, said closure portion having a drain-line extending downwardly from the inner side thereof and having a shutoff-valve operatively connected within said drain-line, a steam-line leading to the inner side of said cup-shaped portion and having a pair of spaced shut-off valves operatively connected therewithin, and a withdrawal-line having one end extending within said vessel and terminating below the liquid-level thereof and having its other end communicating with said steam-line at a point intermediate the two steam-line shutoff-valves, said withdrawal-line having a shutoff-valve operatively connected therewithin adjacent its point of communication with said steam-line.

SAMUEL C. BEESCH.

REFERENCES CITED

The following references are of record in the file of this patent:

UNITED STATES PATENTS

| Number | Name | Date |
|--------|------|------|
| 346,066 | Puffer | July 20, 1886 |
| 878,136 | Henius | Feb. 4, 1908 |
| 2,300,194 | Anderson | Oct. 27, 1942 |
| 2,341,259 | Baldwin | Feb. 8, 1944 |
| 2,355,620 | Bower | Aug. 15, 1944 |
| 2,434,723 | Schook | Jan. 20, 1948 |